United States Patent
Funk et al.

(10) Patent No.: US 7,925,249 B2
(45) Date of Patent: *Apr. 12, 2011

(54) SECURE CONTROL OF A WIRELESS SENSOR NETWORK VIA THE INTERNET

(75) Inventors: Karsten Funk, Mountain View, CA (US); Sharmila Ravula, Mountain View, CA (US); Jochen Schaefer, Beerfelden-Hetzbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/898,869

(22) Filed: Oct. 6, 2010

(65) Prior Publication Data

US 2011/0019621 A1  Jan. 27, 2011

Related U.S. Application Data

(63) Continuation of application No. 10/946,405, filed on Sep. 20, 2004, now Pat. No. 7,817,994.

(51) Int. Cl.
*H04M 3/00* (2006.01)

(52) U.S. Cl. ....... 455/419; 455/411; 455/41.2; 455/445; 455/420; 370/328; 370/338; 370/352; 709/203

(58) Field of Classification Search .......... 455/410–411, 455/418–420, 41.2, 445; 370/352, 401, 328, 370/338; 709/203, 206
See application file for complete search history.

(56) References Cited

U.S. PATENT DOCUMENTS

| | | | |
|---|---|---|---|
| 5,388,211 A | 2/1995 | Hornbuckle | 717/178 |
| 5,790,043 A | 8/1998 | Hettich et al. | 340/5.62 |
| 5,987,135 A | 11/1999 | Johnson et al. | 709/224 |
| 6,023,223 A * | 2/2000 | Baxter, Jr. | 340/531 |
| 6,359,270 B1 * | 3/2002 | Bridson | 219/679 |
| 6,374,079 B1 | 4/2002 | Hsu | 455/11.1 |
| 6,643,779 B1 | 11/2003 | Leung | |
| 6,646,564 B1 | 11/2003 | Azieres et al. | 340/679 |
| 6,700,220 B2 | 3/2004 | Bayeur et al. | 307/10.2 |
| 6,766,165 B2 | 7/2004 | Sharma et al. | |
| 6,856,820 B1 | 2/2005 | Kolls | 455/575.9 |
| 6,938,076 B2 * | 8/2005 | Meyer et al. | 709/219 |
| 6,995,667 B2 * | 2/2006 | He et al. | 340/539.13 |
| 7,023,357 B2 | 4/2006 | Fu et al. | 340/825.72 |
| 7,209,946 B2 * | 4/2007 | Dowling | 709/203 |
| 7,210,625 B2 | 5/2007 | McNutt et | 235/385 |
| 7,266,344 B2 | 9/2007 | Rodriguez | 455/41.3 |

(Continued)

FOREIGN PATENT DOCUMENTS

WO  WO 01/50289  7/2001

(Continued)

OTHER PUBLICATIONS

European Search Report, Application No. EP 05784872.3, dated Apr. 22, 2009.

(Continued)

*Primary Examiner* — Sharad Rampuria

(57) ABSTRACT

A method and a system for controlling a wireless sensor network from a user interface coupled to the Internet are provided. A user accesses an Internet-based portal from the user interface and establishes a secure broadband Internet connection between a remote control module coupled to the wireless sensor network and the portal. The connection is established by manually triggering a connection between the remote control module and the portal from the remote control module.

33 Claims, 3 Drawing Sheets

U.S. PATENT DOCUMENTS

| | | | |
|---|---|---|---|
| 7,283,816 B2 * | 10/2007 | Fok et al. | 455/423 |
| 7,307,521 B2 | 12/2007 | Funk et al. | 340/539.1 |
| 7,324,815 B2 * | 1/2008 | Ross et al. | 455/425 |
| 7,363,031 B1 | 4/2008 | Aisa | 455/419 |
| 7,389,341 B2 | 6/2008 | Cornelius et al. | 709/224 |
| 7,423,529 B2 | 9/2008 | Singer et al. | 340/540 |
| 7,433,740 B2 | 10/2008 | Hesse et al. | 700/1 |
| 7,443,964 B2 | 10/2008 | Urban et al. | 379/88.23 |
| 7,507,946 B2 | 3/2009 | Goldberg et al. | 250/208.1 |
| 7,509,116 B2 | 3/2009 | Fan et al. | 455/405 |
| 7,526,539 B1 * | 4/2009 | Hsu | 709/223 |
| 7,561,019 B2 | 7/2009 | Sasakura et al. | 340/5.1 |
| 7,561,877 B2 * | 7/2009 | Cassett et al. | 455/423 |
| 7,630,706 B2 * | 12/2009 | Weigand | 455/418 |
| 7,653,383 B2 | 1/2010 | Natarajan | 455/419 |
| 7,697,927 B1 | 4/2010 | Owens | 455/420 |
| 7,817,994 B2 * | 10/2010 | Funk et al. | 455/419 |
| 2002/0004387 A1 | 1/2002 | Newville | 455/420 |
| 2002/0082002 A1 | 6/2002 | Fujii | 455/419 |
| 2003/0023333 A1 | 1/2003 | Birkle | |
| 2003/0112772 A1 | 6/2003 | Chatterjee et al. | |
| 2003/0151513 A1 | 8/2003 | Herrmann et al. | |
| 2004/0086093 A1 | 5/2004 | Schranz | 379/37 |
| 2004/0102683 A1 | 5/2004 | Khanuja et al. | |
| 2004/0159700 A1 * | 8/2004 | Khan et al. | 235/380 |
| 2004/0171370 A1 | 9/2004 | Natarajan | 455/413 |
| 2004/0218602 A1 | 11/2004 | Hrastar | 370/390 |
| 2006/0293029 A1 | 12/2006 | Jha et al. | 455/411 |
| 2008/0165789 A1 * | 7/2008 | Ansari et al. | 370/401 |
| 2010/0001665 A1 | 1/2010 | Brockmann | 315/316 |

FOREIGN PATENT DOCUMENTS

| | | |
|---|---|---|
| WO | WO 02/095506 | 11/2002 |

OTHER PUBLICATIONS

International Search Report for PCT/US05/28085, Date of Mailing Mar. 16, 2006.

* cited by examiner

SECURE CONTROL OF A WIRELESS SENSOR NETWORK VIA THE INTERNET

CROSS-REFERENCE TO RELATED APPLICATION

This application is a continuation of, and claims priority under 35 U.S.C. §120 to, U.S. patent application Ser. No. 10/946,405, filed on Sep. 20, 2004, now U.S. Pat. No. 7,817,994 which is expressly incorporated by reference herein in its entirety.

FIELD OF THE INVENTION

The present application relates generally to remote control of wireless networks, and in particular relates to a system and method for providing a secure link between a portal and a wireless sensor network that enables a user to configure the wireless sensor network from the portal in a secure manner.

BACKGROUND INFORMATION

Individual sensors and sensor networks are being used to an ever greater extent in a wide variety of applications to monitor ambient and operating conditions of systems. Such applications include, for example, building control systems for lighting, access control, climate control, and temperature regulation; industrial applications, such as monitoring power usage and distribution, environmental monitoring of air and water quality, chemical concentration, etc. Sensors are also being used in health care applications to monitor heart rate, blood pressure and other health status data.

There are several technical challenges associated with the use of sensors in this context. Generally, measurement data must be collected, processed and aggregated in a form adapted for transmission, and then transmitted to a controller and/or processing center either over a wireline or a wireless connection. Wired systems suffer the disadvantages that they are expensive to install, difficult to modify, limited in functionality once installed, and obtrusive with respect to preexisting infrastructure. Wireless systems overcome these difficulties since they are easy to install and modify, and do not necessarily interfere with any preexisting infrastructure. However, whereas a wired system has a well-defined connection between the sensor(s) and the base station, in wireless systems the connection between the sensor modules and the base station needs to be initialized, continually controlled and secured against breach, interception and hacking. In particular, during the initialization of the network, sensor network nodes, which receive signals directly from the sensors, must be validated before being admitted to the network.

Currently, there are two main techniques for controlling a wireless sensor network: i) providing an extensive user interface at the base station; and ii) using open networks to remotely control the wireless system. The former technique suffers from the fact that providing an extensive interface at the base station increases the complexity of the base station, requiring user interface controls and additional computing power. The latter "remote control" approach, which may be implemented using either PSTN (Public Service Telephone Network) or Internet-based connection in conjunction with a communications device at the wireless network base station, provides the advantage of worldwide remote access. As an example, U.S. Pat. No. 6,643,779 to Leung et al. describes a system in which the base station includes a web server functionality, thereby enabling communication between a local security network and the Internet. However, this technique suffers from the disadvantages that additional computational resources are required at the base station to implement the web server, Internet access must be static, and that the system remains exposed to hacking threats.

SUMMARY OF THE INVENTION

The present invention provides a method for controlling a wireless sensor network coupled to a local remote control module from an Internet-based user interface in which an Internet-based portal is accessed from the user interface and a secure connection is established between the remote control module and the portal. According to one embodiment, the connection is established by manually triggering a connection between the remote control module and the portal from the remote control module.

The present invention also provides a system including a wireless sensor network, a remote control module adapted to exchange signals with the wireless sensor network via a base station (which may have a broadband interface to the Internet), and a portal coupled to the Internet that includes an application for configuring and initializing the wireless sensor network; a user interface is coupled to the Internet and adapted to communicate with the portal. A secure connection between the remote control module and the portal is initiated from the remote control module, enabling control of the wireless sensor network from the user interface via the portal. According to one embodiment, the remote control module includes a user interface for manually triggering the secure connection to the portal.

DETAILED DESCRIPTION

The present invention provides a system and method for secure interaction between a wireless sensor network and a remote user interface coupled to the Internet or the PSTN. The remote user interface connects to a portal which acts as a secure interface between the wireless network and the Internet, and which portal assists in installation, initialization and/or use of the network. Significantly, the portal also acts as an Internet proxy and therefore as a shield against tampering.

Figure 1:
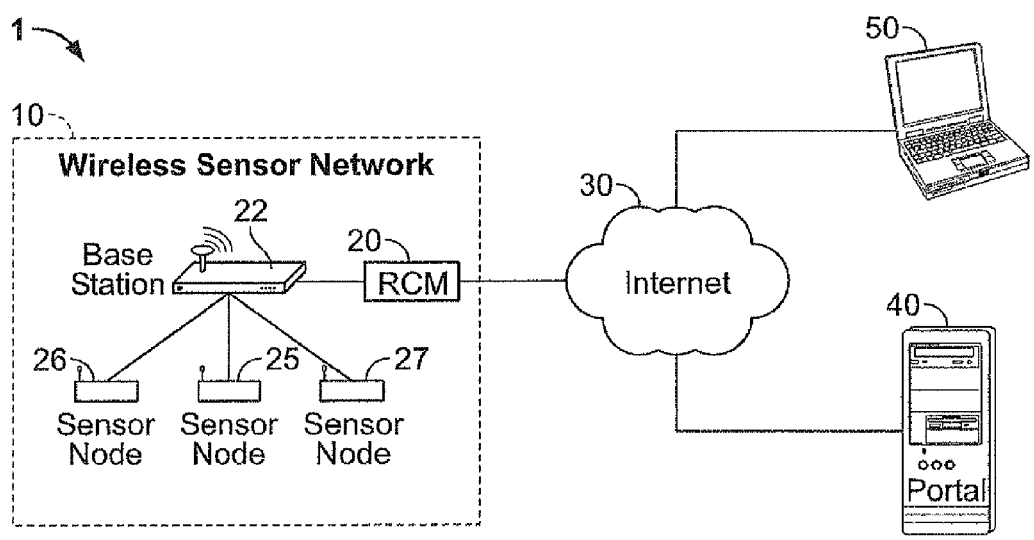
FIG. 1 shows an exemplary schematic diagram of a system for securely controlling a wireless sensor network according to the present invention.

FIG. 1 depicts in schematic form an embodiment of a system 1 for securely controlling a wireless sensor network according to the present invention. The overall system 1 includes a wireless sensor network 10 having one or more sensors set up in a locality for monitoring purposes. Each of the sensors included in the wireless sensor network 10 communicates wirelessly with a number of wireless sensor nodes 25, 26, 27. Although three wireless sensor nodes 25, 26, 27 are shown, different numbers of sensor nodes may be employed in exchanging signals with the wireless sensor network 10. The wireless sensor nodes 25, 26, 27 are coupled to a base station 22. The base station 22 includes (or is coupled to) a Remote Control Module 20 ("RCM") that may be used in initializing and controlling the wireless sensor network 10 and the wireless sensor nodes 25, 26 and 27, as will be described in further detail below.

The RCM 20 is coupled to the Internet such as via a continual (always on) broadband connection using proprietary Internet security and authentication mechanisms. The connection may be direct or through a firewall or router using known standards. Alternatively, the RCM 20 may include a modem connection to the Public Service Telephone Network (PSTN). The RCM 20 is able to establish secure, encrypted communication with a web-server portal 40, which is also coupled to the Internet. The RCM 20 can be configured so that it reports any activity regarding the wireless sensor network 10 and sensor nodes 25, 26, 27 to the portal 40, so that the portal obtains updated information. Furthermore, since the portal 40 typically has larger computational resources than the RCM 20, the portal can process the information received from the RCM and can provide substantial media interaction to aid the user in initializing, maintaining or configuring the wireless sensor network 10 and sensor nodes 25, 26, 27 via the RCM. For example, the portal 40 may play an animated movie on how to find a system serial number, which button(s) to press on the user interface of the RCM or how to replace a sensor node battery. The portal 40 can also automatically guide the user step by step through the initialization process.

A user or administrator can obtain access to the latest status information by securely logging into the portal 40 via the Internet from a remote user interface on a PC-browser 50. While logged in to the portal 40, the user can send configuration instructions to RCM 20, once a secure connection has already been established between them. To communicate with the correct wireless sensor network, the portal links the RCM 20 Internet connection to the PC-browser 50 Internet connection. The portal 40 can allow changes to be transmitted to the RCM 20 via a secure and encrypted Internet connection between the PC-browser 50 and the portal, as well as between the portal and the RCM (end-to-end-security), subject to an authentication process.

Figure 2:
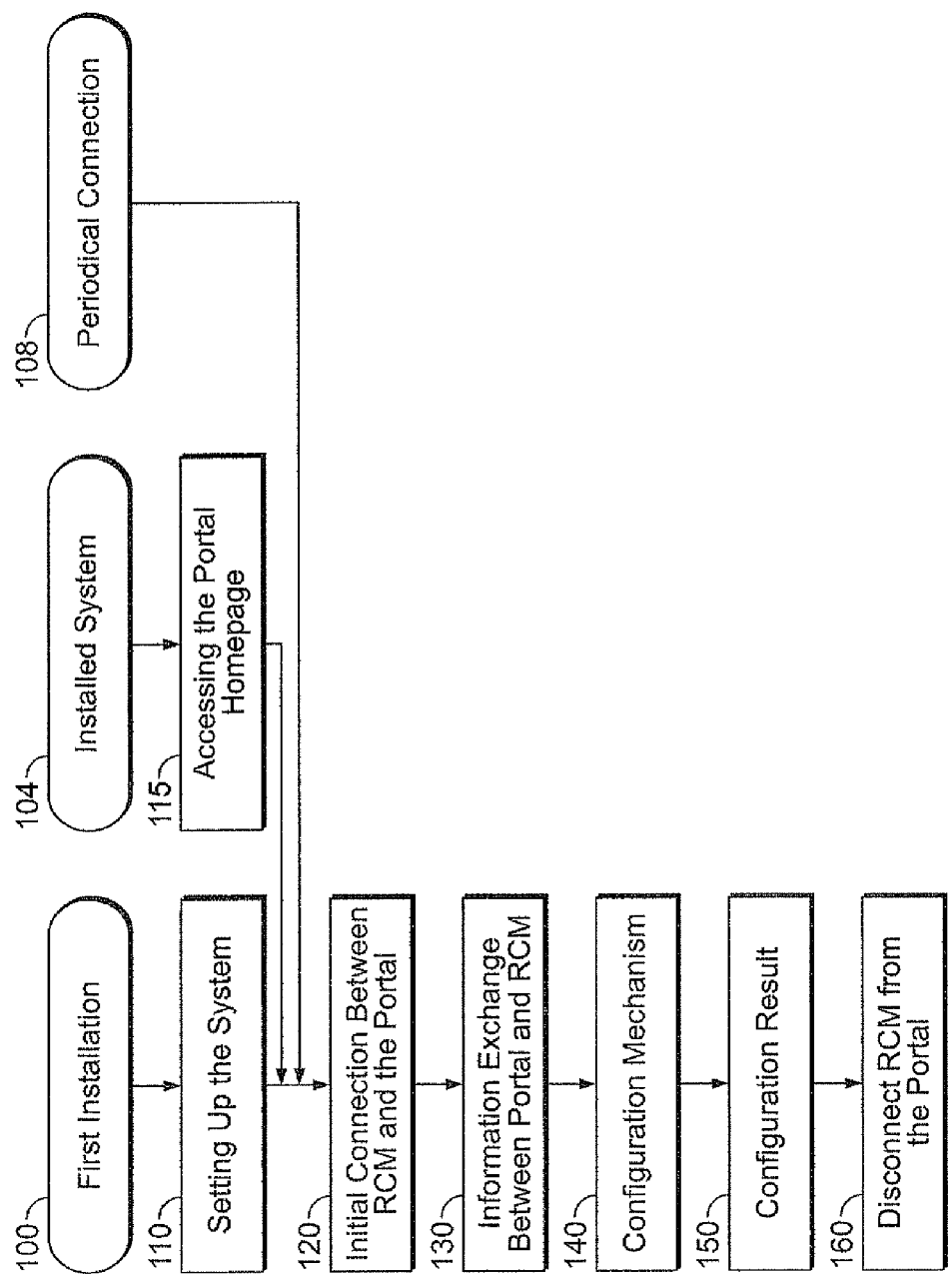
FIG. 2 shows an exemplary, flowchart for using the portal to interact with the remote control module (RCM) of the wireless sensor system.

FIG. 2 shows an exemplary flowchart for using the portal to interact with the RCM of the wireless sensor system. To set up the system upon first installation 100, the user can access the portal for installation instructions that explain, for example, the proper placement of sensors and antennae orientation. In step 110, the base station of the RCM is activated and identifies each of the sensor nodes within communication distance. All available network node identifications are stored in a table at the base station. As an added security measure, the user may be asked to verify the nodes that were identified and approve their admittance to eliminate the possibility that the base station picked up external nodes that were installed concurrently in a nearby system. After approving the verified nodes, the network topology is stored in the base station and within the nodes themselves. At the portal, the user can associate a name with each of the identified nodes for easy reference. In addition, during the original set up 110, the user can set how often the RCM should automatically connect to the portal to transmit updated status information, and the user can also select a method for event-related notifications, such as by email, cell phone or short messaging service (SMS).

In step 120, an initial connection is made between the RCM and the portal. According to a first technique, the user activates a connection at the base station by pressing an initialization button on the RCM. The RCM then transmits information including the network node table to the IP address of the portal (which is programmed into the RCM) over a secure encrypted communication link, which may be a broadband connection. The user may log in to the portal simultaneously so that information sent from the RCM can be viewed at the portal. Since this technique involves initiation from the base station, which is typically located at the user's residence, it is automatically secure because it is almost impossible to access the RCM from the Internet, hence completely preventing any attempt by hackers to disable functions of the RCM remotely. In particular, the RCM denies its existence toward any attempt to connect to it from the Internet. The only way a connection to the portal can be established is through one of the following cases, each of which is initiated through the RCM: a) when the connection is manually initiated by pressing a button at the RCM; b) during scheduled status reports initiated by the RCM; and c) in the case of an alert or alarm reported by the RCM to the portal. Using this technique, a possible hacker cannot connect to the RCM starting from the portal as a connection can only be initiated from the RCM. Any attempt to connect to the RCM from the outside is rejected. This makes the connection safe by default, since the RCM can only connect to the preset IP address of the portal.

Alternatively, the user may initiate the connection externally by prompting for a connection with the RCM. In this case, the portal may be used to notify the RCM to connect to the Internet. The notification may be a verified method such as call to the RCM over a phone line, in which case the caller ID could be used to identify the portal; this may be compared to a pre-programmed number at the RCM, which identifies the portal; a session ID can also be used as an additional security mechanism. Similarly, if the RCM includes a modem, the portal can call the modem directly; the notification can also consist of an instant message, a wireless call, or any other means that allows the RCM to identify a request for contact from the portal. Upon notification, the RCM can connect to the portal over a broadband connection to the Internet, or if it includes a modem, the RCM can establish a direct modem-to-modem connection with the portal over the PSTN. When the RCM calls the portal upon notification, a security handshake process between the RCM and the portal takes place. The security mechanisms may include one or more of an SSL connection, public/private key authentication/encryption, a network layer security system such as IPSec or Kerberos, an application layer security mechanism or any other encryption techniques as known in the art.

Once the initial connection between the RCM and the portal is made, in step 130, information is delivered to the portal. This information may include the status of the wireless sensor network and sensor nodes, and data measured by the sensors over a certain period of time. In addition, the RCM can query, or send a function call to, the portal requesting specific data. The portal can provide information in response to such queries in the return value of the function call in accordance with its own, programmed configuration.

In this regard, the user is able to program or provide configuration data used for modifying or setting the wireless sensor system through the portal web site when the RCM is offline. This configuration data may be stored in a database at the portal. In step 140, when the RCM connects to the portal, the RCM automatically determines whether new configuration data is available. If so, this data is transmitted from the portal to the RCM, so that the RCM becomes configured in accordance with the data entered by the user through the portal site. In step 150, after the configuration process is complete, the RCM sends back information related to the "result" of the configuration process. For example, if a node is not detected upon configuration, the RCM may send back a request for the user to move the undetected node to another location to ensure that it is within communication range.

After it is determined that a configuration was performed properly and that no further configuration data needs to be updated, and the RCM has sent a status report to the portal, the RCM disconnects from the portal in step 160. The RCM also disconnects from the portal if a failure in the security protocol is detected. At lower protocol levels, the security mechanism itself detects for a security failure, and at the application layer, the application itself performs the validation check.

Once the wireless sensor system has been installed and an initial configuration has taken place (indicated by step 104), the set up stage (step 110) is no longer necessary. The user can obtain access, in step 115, to the portal user interface after proper authentication each time he or she logs on to the portal web page from any PC-browser. Through the user interface, the user can make use of a variety of modification and reconfiguration options such as, for example, reconfiguring the interval for automatic, periodic connection, reconfiguration of the method employed for status notifications, and setting, up or modifying selected events. As an example, the user may configure the RCM so that a notification is sent if a sensor measures a particular value of a parameter. In addition to reconfiguration options, the user may access the portal to obtain current information sent to the portal from the RCM, including, but not limited to, failures, alarms, measured values, and the status of each sensor including whether it is open or closed, whether it is operating or stopped, and whether it is armed or disarmed. After the access step 115, the other steps of the interactive process (steps 120, 130, 140, 150 and 160) may follow. As noted above, the user can configure the RCM to connect to the Internet periodically (indicated by step 108). In this case, the RCM is not triggered, and the connection is performed automatically; the remaining steps in the interactive process, including the downloading of system updates, configuration, and the transmission of sensor data and status, may follow.

Figure 3:
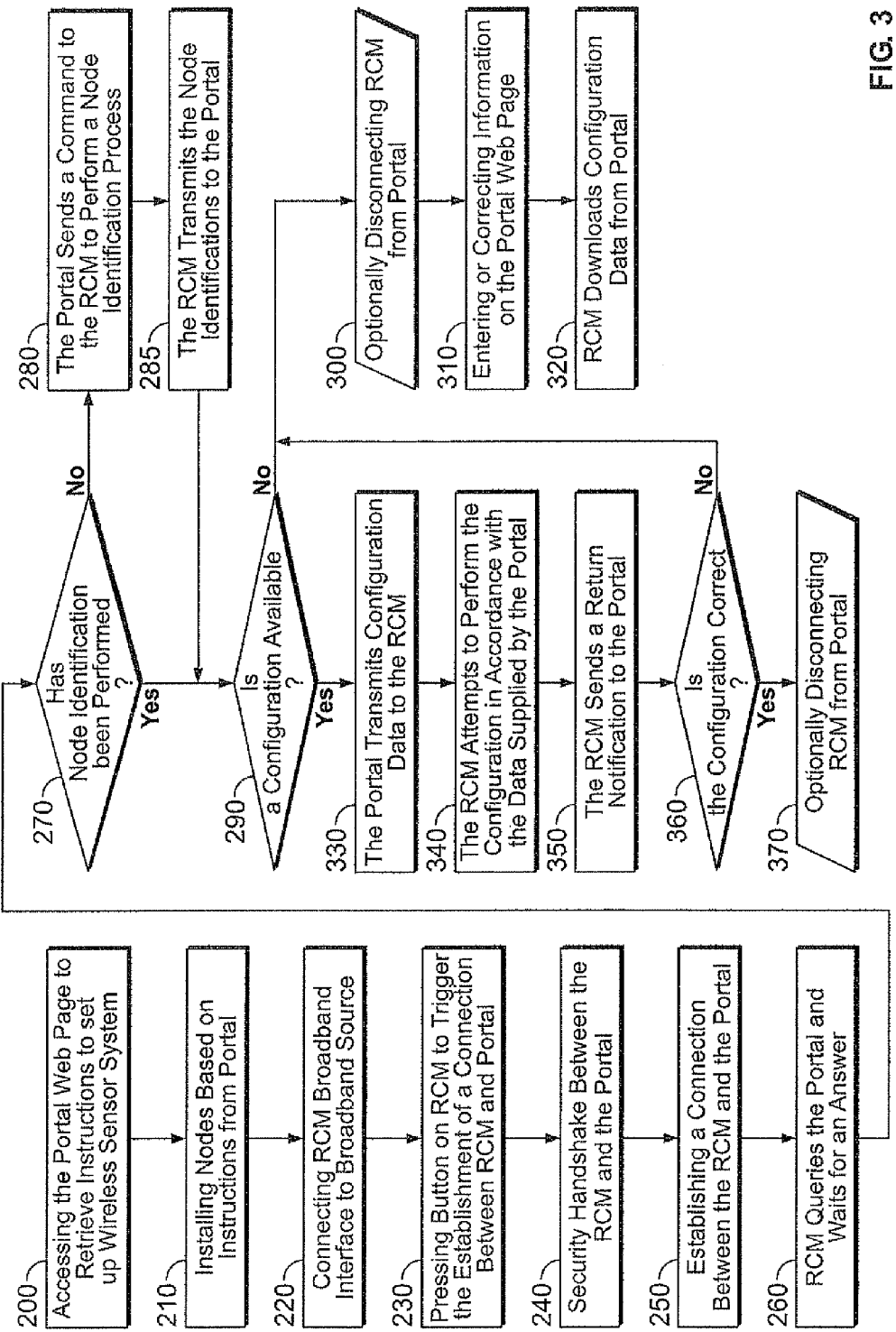
FIG. 3 illustrates an embodiment of a method for establishing a connection between the RCM and the portal and performing sensor node configuration.

FIG. 3 illustrates an embodiment of a method for establishing a connection between the RCM and the portal and performing sensor node configuration. In a first step 200, the user accesses the portal web page to consult instructions for setting up the wireless sensor system. In step 210, the user installs the sensor nodes in various physical locations in accordance with the instructions provided by the portal. In step 220, the user connects the broadband interface of the RCM to the broadband source (e.g., cable, DSL) and then, in step 230, presses a button on the RCM to trigger the process of establishing a connection between the RCM and the portal via the broadband communication service. In step 240, a security handshake between the RCM and the portal occurs, which, if successful, results in the establishment of a connection between the RCM and the portal in step 250. The RCM then queries the portal and waits for an answer (step 260). In step 270, it is determined whether identification of the nodes of the wireless system has been performed. If not, the portal sends a command to the RCM to perform a node identification process in step 280, after which step the RCM transmits the node identifications to the portal in step 285.

If, in step 270, it is determined that a node identification has already been performed, or, after node identification is performed in step 285, it is determined whether new configuration information is available in step 290. If no new configuration information is available, the user may optionally disconnect the RCM from the portal (step 300), or the user may enter or correct further information on the portal web page (310) and then download the updated information to the RCM from the portal (step 320) by cycling back to step 230. If, in step 290, it is determined that new configuration data is available, then, in step 330, the portal transmits the configuration data to the RCM, and then the RCM attempts to perform the configuration of the sensor system in accordance with the data supplied by the portal in step 340. The RCM then sends a notification to the portal indicating whether or not the configuration was successfully performed (step 350). At the portal, it is determined whether the configuration is correct (step 360). If it is correct, the RCM may be disconnected from the portal in step 370. If it is not correct, the process cycles back to step 300, which gives opportunity for correction through step 310.

In the foregoing description, the systems and methods of the present invention have been described with reference to a number of examples that are not to be considered limiting. Rather, it is to be understood and expected that variations in the principles of the systems and methods herein disclosed may be made by one skilled in the art, and it is intended that such modifications, changes, and/or substitutions are to be included within the scope of the present invention as set forth in the appended claims.

What is claimed is:

1. A method for controlling a wireless sensor network coupled to a local remote control module from an Internet-based user interface, the method comprising:
   accessing an Internet-based portal from the user interface via the Internet; and
   establishing a secure connection between the remote control module and the portal via the Internet;
   wherein:
      communication between the remote control module and the portal is encrypted; and
      the user interface and the portal are remotely located from the remote control module, from the wireless sensor network, and from each other.

2. The method of claim 1, wherein the establishing step includes manually triggering a connection between the remote control module and the portal from the remote control module.

3. The method of claim 2, wherein the manual triggering is performed by pressing an activation button on the remote control module.

4. The method of claim 1, wherein the establishing step includes sending a notification from the portal to the remote control module indicating a request to establish a connection.

5. The method of claim 4, wherein the notification includes:
   placing a telephone call to the remote control module; and
   recording a caller identification (ID) from the call at the remote control module.

6. The method of claim 1, further comprising:
   guiding set up of the wireless sensor network from the portal; and
   transmitting configuration data from the portal to the remote control module.

7. The method of claim 1, wherein the remote control interface includes a broadband interface, and the connection between the remote control module and the portal is made over the Internet.

8. The method of claim 1, wherein the remote control interface includes a modem, and the connection between the remote control module and the portal is made over the Public Service Telephone Network (PSTN).

9. A system comprising:
   a wireless sensor network;
   a remote control module directly connected to the wireless sensor network and adapted to exchange signals with the wireless sensor network via a base station, the remote control module including a broadband interface to the Internet;

a portal coupled to the Internet, the portal including an application for configuring and initializing the wireless sensor network; and a user interface coupled to the Internet and adapted to communicate with the portal via the Internet;

wherein the user interface and the portal are remotely located from the remote control module, from the wireless sensor network, and from each other;

wherein a secure connection between the remote control module and the portal via the Internet is initiated from the remote control module, thereby enabling control of the wireless sensor network from the user interface via the portal; and wherein communication between the remote control network and the portal is encrypted.

10. The system of claim 9, wherein the remote control module includes a user interface for manually triggering the secure connection to the portal.

11. The system of claim 9, wherein the wireless sensor includes at least one sensor node, and the remote control module is adapted to identify the at least one sensor node in communication with the base station and to store the identified sensor node in a table.

12. The system of claim 9, wherein prior to the initiation of a connection between the remote control module and the portal, the portal notifies the remote control module of a request to establish a connection via a telephone call.

13. The system of claim 12, wherein the remote control module establishes a broadband Internet connection with the portal upon receiving and rejecting the telephone call.

14. The system of claim 13, wherein the remote control module uses a caller identification (ID) of the portal derived from the telephone call to authenticate the portal.

15. The method of claim 1, wherein once a secure connection is established, configuration information is downloaded from the portal to the local remote control module.

16. The method of claim 15, wherein after the configuration information is downloaded, the remote control module sends a notification to the portal indicating whether or not the configuration was successfully performed.

17. The system of claim 9, wherein once a secure connection is established, the portal transmits configuration information to the remote control module.

18. The system of claim 17, wherein after the configuration information is downloaded, the remote control module sends a notification to the portal indicating whether or not the configuration was successfully performed.

19. The method of claim 1, wherein a connection between the remote control module and the portal can only be established through the remote control module.

20. The method of claim 19, wherein the connection can be established only in one of the following cases:
a) by manually pressing a button at the remote control module;
b) during scheduled status reports initiated by the remote control module;
c) when an alert or alarm is reported by the remote control module to the portal.

21. The method of claim 19, wherein the remote control module is pre-programmed with an internet protocol address of the portal.

22. The method of claim 1, further comprising:
transmitting, via the Internet, configuration data, input via the user interface, to the portal;
transmitting, from the portal to the remote control module and via the Internet, the configuration data received by the portal; and configuring the wireless sensor network, by the remote control module and in accordance with the configuration data received by the remote control module.

23. The method of claim 22, further comprising:
setting the remote control module such that configuration data is transmissible from the portal to the remote control module only in a connection between the remote control module and the portal that is initiated by the remote control module.

24. The method of claim 23, wherein the user-input configuration data is received by the portal when a connection is not established between the remote control module and the portal, the method further comprising:
storing the user-input configuration data at the portal at least until a connection initiated by the remote control module is established during which connection the user-input configuration data is transmitted by the portal to the remote control module.

25. The method of claim 23, wherein the user-input configuration data is received by the portal when a connection is not established between the remote control module and the portal, the method further comprising:
responsive to receipt of the user-input configuration information, the portal initiating a first connection with the remote control module, in which the portal requests a second connection in which to transmit the user-input configuration data;
responsive to receipt of the request in the first connection, the remote control unit initiating the second connection with the portal; and
in the second connection, the portal transmitting the user-input configuration data to the remote control unit.

26. The method of claim 22, wherein the portal stores a user-interface program via interaction with which the configuration data is inputtable by a user, the user-interface program providing information regarding sensors of the sensor network and being accessible from the user interface via the Internet.

27. The method of claim 26, wherein information regarding the sensors is transmitted from the remote control unit to the portal and is subsequently viewable at the user interface via interaction, via the Internet, with the user-interface program of the portal.

28. A method for controlling a wireless sensor network coupled to a local remote control module from an Internet-based user interface, the method comprising:
accessing an Internet-based portal from the user interface;
establishing a secure Internet connection between the remote control module and the portal, the establishment of the secure connection being initiated via the Internet by the remote control module; and
denying, by the remote control module, any attempted connection via the Internet to the remote control module not initiated by the remote control module;
wherein the user interface and the portal are remotely located from the remote control module, from the wireless sensor network, and from each other.

29. The method of claim 28, further comprising:
sending a notification from the portal to the remote control module indicating a request to establish the secure connection, the establishment of the secure connection being performed responsive to the request.

30. The method of claim 29, wherein the remote control interface includes a modem, and the notification is sent from the portal to the remote control module over the Public Service Telephone Network (PSTN).

31. The method of claim 28, wherein:
the remote control module is adapted to:
- exchange signals with the wireless sensor network via a base station;
- identify at least one sensor node of the wireless sensor network that is in communication with the base station; and
- store the identified at least one sensor node in a table; and a network topology is stored in the base station and within at least one of the sensor nodes.

32. The method of claim 28, further comprising:
receiving user input control instructions via the user interface;
transmitting the instructions from the user interface to the accessed portal, and from the portal to the remote control module via the secure Internet connection; and
controlling, by the remote control module, the wireless sensor network using the instructions.

33. The method of claim 28, wherein:
the accessing the Internet-based portal from the user interface is via the Internet; and
the communication between the remote control module and the portal is encrypted.

* * * * *